United States Patent [19]

Beck

[11] 4,111,713

[45] Sep. 5, 1978

[54] HOLLOW SPHERES

[75] Inventor: Warren R. Beck, Saint Paul, Minn.

[73] Assignee: Minnesota Mining and Manufacturing Company, Saint Paul, Minn.

[21] Appl. No.: 544,965

[22] Filed: Jan. 29, 1975

[51] Int. Cl.² .............................................. C03B 19/10
[52] U.S. Cl. ............................. 106/288 B; 106/40 V; 65/21; 428/402; 428/404
[58] Field of Search ............. 106/40 V, 288 B; 65/21; 264/117, 41; 260/2.5 R

[56] References Cited

U.S. PATENT DOCUMENTS

| | | | |
|---|---|---|---|
| 3,172,867 | 3/1965 | Showalter | 260/2.5 |
| 3,669,912 | 6/1972 | Hinton | 260/2.5 |
| 3,875,271 | 4/1975 | Martin | 264/13 |
| 3,875,272 | 4/1975 | Martin | 264/13 |
| 3,875,273 | 4/1975 | Martin | 264/13 |
| 3,891,574 | 6/1975 | Kobayashi et al. | 210/40 |
| 3,928,949 | 12/1975 | Wagner | 51/401 |
| 3,975,194 | 8/1976 | Farnand et al. | 106/41 |
| 3,978,269 | 8/1976 | Martin | 428/403 |

Primary Examiner—Winston A. Douglas
Assistant Examiner—J. V. Howard
Attorney, Agent, or Firm—Cruzan Alexander; Donald M. Sell; Roger R. Tamte

[57] ABSTRACT

Novel hollow spheres are made by tumbling solidifiable liquid globules of binder material in a mass of minute solid discrete free-flowing particles. The particles serve as a parting agent during the tumbling action, keeping the globules separate from one another, and become at least partially absorbed into the globules. As the tumbling proceeds, the globules are first converted to a hollow, generally spherical condition by the action of a volatile void-forming agent in the binder material, and then solidify. The new hollow spheres made by this process have a solidified seamless exterior wall that carries at least on its exterior surface partially embedded, partially protruding parting agent particles, and usually is filled throughout at least a major portion of its thickness by parting agent particles.

32 Claims, 5 Drawing Figures

HOLLOW SPHERES

BACKGROUND OF THE INVENTION

The present invention provides a new process for making hollow spheres, particularly hollow macrospheres (the term "macrosphere" is used herein for spheres that are larger than about 500 micrometers (½ millimeter) in diameter, and contrasts with the term "microsphere," which is generally applied to smaller-sized spheres best viewed with a microscope).

In addition, hollow spheres made by the new process are unique in structure and properties, adapting them to a wide variety of uses.

An example of the advance made by the invention lies in the use of hollow spheres as lightweight filler materials. At the present time, the lowest-cost commercial hollow spherical filler materials are microspheres on the order of 5 to 300 micrometers in diameter. These commercial hollow microspheres may be either glass microspheres (made by passing particles of amorphous glass or glass-forming ingredients that contain a blowing agent through a current of heated air or a flame; see Beck et al., U.S. Pat. No. 3,365,315 and Veatch et al., U.S. Pat. No. 3,030,215) or organic polymeric microspheres (made by spray-drying liquid droplets that contain a film-forming material and a blowing agent dissolved in a volatile solvent; see Veatch et al., U.S. Pat. No. 2,797,201; or by forming an aqueous dispersion of organic polymerizable monomeric materials and a liquid blowing agent, then polymerizing the monomeric material to form a thermoplastic expandable polymer particle having encapsulated therein the volatile liquid blowing agent, and then heating the particle; see Morehouse et al., U.S. Pat. No. 3,615,972).

While the commercial hollow microspheres are useful in many ways, only larger-diameter hollow spheres can satisfy other important uses. For example, larger hollow spheres are needed for use with smaller sized hollow spheres in bi-or tri-modal packing arrangements (see Beck, U.S. Pat. No. 3,585,157) to achieve filled articles having a lower density than articles filled only with the smaller spheres. One large potential use for such bi- or tri-modal filling would be in syntactic foams, which have been the subject of extensive development effort to provide flotation materials useful in off-shore oil-drilling rigs and other water-borne vessels.

The potential utility for larger hollow spheres has been recognized for a long time. But until the present invention, no one has apparently known how to make such spheres at low cost. Matthews et al., U.S. Pat. No. 3,838,998 teaches a process said to prepare moderately sized glass spheres (50 to 5000 micrometers in diameter), but the spheres prepared are not as large as desired and the process has never resulted in commercial use. Insofar as I am aware, the only large spheres that have been commercially available — epoxy spheres on the order of 0.1 to 1 centimeter in diameter apparently made by individually coating spherical polystyrene foam particles with a curable epoxy-based composition and then curing the coating; or composite spheres on the order of a centimeter in diameter made by separately molding hemispheres and bonding them together — have been too high in cost for widespread utility. Despite the commercial availability of such larger spheres for many years, and despite the recognized potential utility for such spheres if they could be provided at lower cost, no one has previously provided a low-cost large-diameter hollow sphere.

SUMMARY OF THE INVENTION

Briefly, in a new method of the present invention, solidifiable liquid globules of binder material that include a volatile void-forming agent adapted to convert the liquid globules to a hollow condition upon volatilization are tumbled together and thoroughly mixed with a free-flowing mass of minute discrete solid particles (for many purposes, the solidifiable, liquid globules are formed coincidentally with the tumbling by heating solid granules of the binder material). The mass of particles functions to separate the liquid globules of binder material from one another, and the particles are denominated herein as "parting agent particles." These parting agent particles are wetted by, and at least partially absorbed into, the liquid globules during the tumbling action, and sufficient of the particles are present so that any portion of liquid globules uncovered by the particles tumble against discrete unabsorbed particles.

During the tumbling action conditions are provided for the volatile void-forming agent to convert the liquid globules to a hollow condition and for the converted liquid globules to solidify. After the liquid globules have solidified to a shape-retaining condition, they are collected.

The resulting hollow spheres have a solidified seamless exterior wall that comprises a single thickness of binder material (which may include two or more ingredients in mixture) and parting agent particles. At least some of the parting agent particles in the wall are partially embedded in the wall and partially exposed whereby they form the exterior surface of the sphere that contacts adjacent spheres in the mass of spheres formed by the operation. In most spheres of the invention the exterior wall of the sphere is also filled throughout at least a portion of its thickness by the parting agent particles. For many purposes such a filled-wall hollow sphere is preferred, but in other useful products the particles are only at exterior surface of the spheres.

One way to provide the low-cost large-diameter hollow spheres sought for use as a filler material is to use hollow glass microspheres as the parting agent particle. These hollow microspheres fill the exterior wall of the spheres prepared by the new method, and thus reduce the density of the wall. Further, when the spheres are used in a syntactic foam, the large void at the center of each sphere occupies space that would have been occupied by microsphere-filled polymer if only hollow microspheres had been used as the filler in the foam.

Another inexpensive large hollow sphere can be made using byproduct fines (fine particles obtained as a byproduct from some industrial or mineral operation, including combustion, abrading, crushing, mining, refining, and milling operations) as a parting agent particle. Since the parting agent particle may be a major component of the ultimate hollow sphere (over 80 percent by volume), the low cost of the byproduct fines, which are ordinarily a waste product, makes possible especially low-cost spheres. For example, fly-ash particles, produced by combustion of coal, used as parting agent particles together with an inexpensive binder material such as sodium carbonate, produce a very inexpensive filler material.

These two examples illustrate some of the variety of products possible with the invention. In many embodiments, the parting agent particles have an important function — reducing density and cost in the two examples given above — beyond their use as a parting agent. In fact, sometimes the spheres are simply a support for the parting agent particles; abrasive spheres of the invention prepared using abrasive granules as the parting agent particles are an example.

In other cases the properties of the parting agent particles contribute in large part to the properties of the spheres. For example, when elastomeric parting agent particles such as ground scrap rubber particles are used, unique hollow elastomeric spheres are formed. (The term "elastomeric" is applied herein to materials that can be stretched at room temperature to at least twice their original length, and after having been stretched and the stress removed, return with force to approximately their original length in a short time.)

The binder materials may also be varied widely, from rigid to elastomeric, organic to inorganic, and thermoplastic to thermosetting, to provide additional variety in properties and uses. And the invention permits formation of spheres in a wide range of sizes. Selection of particular kinds of materials, parting agent particles, and sizes of spheres permits a precise tailoring of ultimate properties in a finished article.

ANCILLARY PRIOR ART

Although some prior-art teachings about hollow spheres have points of similarity to the present invention, they do not lead to the invention.

Microsphere-filled polymeric pellets have previously been suggested in U.S. Pat. No. 3,669,912. According to this patent droplets of liquid epoxy-based composition are released over an agitated bed of microspheres. Microspheres become absorbed into the droplets, which are then cured for several hours at an elevated temperature. During the curing period there may or may not be tumbling to produce spherical microsphere-filled pellets. The microsphere-filled pellets are used to prepare large microsphere-filled castings. Ordinarily, large castings of microsphere-filled epoxy material tend to crack as a result of exotherm, but this problem is alleviated by use of the precured pellets.

An important difference between this patent and my invention is the absence of any suggestion in the patent that a void-forming agent be used under conditions that would prepare hollow spheres. My new hollow spheres permit results beyond anything taught in U.S. Pat. No. 3,669,912, and that patent would not lead persons skilled in the art to those new results.

U.S. Pat. No. 3,172,867 describes the preparation of hollow microspheres by admixing a powdered foamable resin composition with a powdered solid medium; arranging the mixture in a quiescent bed; and thereafter heating the mass. The patent gives as an example the mixing of powdered formaldehyde-melamine resin with powdered melamine-surfaced montmorillonite organoclay to form a ⅜-inch-thick (about 1 centimeter thick) layer on a belt conveyor. The conveyor carries the mixture under infrared strip heaters to expose it to 350° F. (175° C.) for 20 minutes. The patent reports the formation of hollow spherical solids having a surface covered with the clay particles, which constitute about 10 weight-percent (estimated to be about 1 volume-percent) of the spheres.

However, there is no suggestion in this patent of tumbling the mixture of resin and clay during curing of the resin, which achieves novel results in my invention. For example, to prepare filled-wall hollow spheres of my invention, the binder material globules are constantly tumbled against fresh parting agent particles to replace any particles that have been absorbed into the hollow spheres. The result is a wall filled with parting agent particles that account for far more than the one percent of sphere volume that is accounted for by the clay particles of the spheres taught in U.S. Pat. No. 3,172,867. This filling of the walls of spheres of the invention is responsible for many of their unique properties, as illustrated above. In addition, tumbling provides for uniformity of spheres of the invention and permits them to expand in volume.

A special combination of events occurs during a process of the invention — including a tumbling of spheres, which are in the process of becoming hollow, in parting agent particles that become at least partially absorbed into the spheres. This combination of events or steps is unique over all known prior art, and it provides unique hollow spheres.

DETAILED DESCRIPTION

Figure 1:
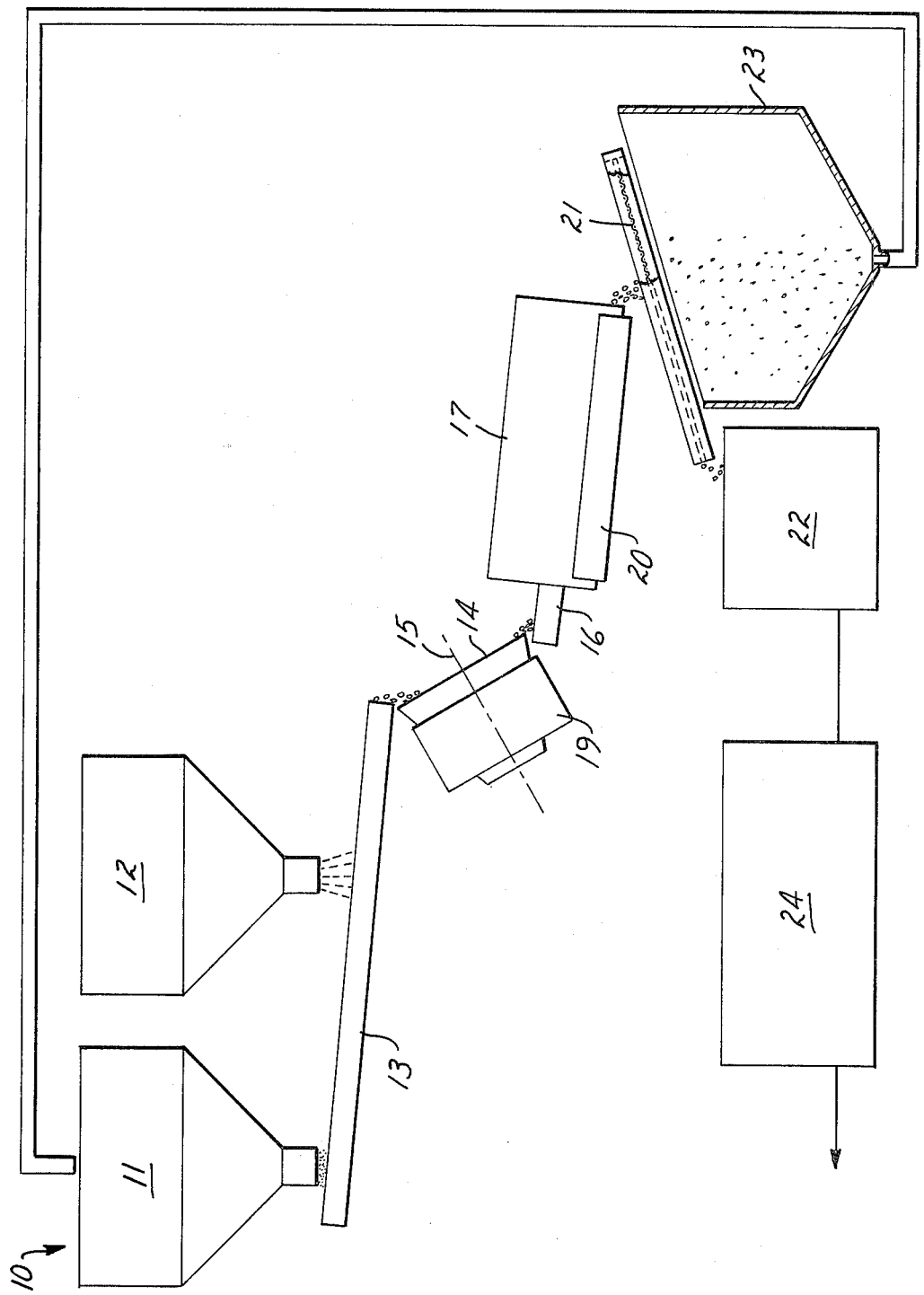
FIG. 1 is a schematic diagram of illustrative apparatus for forming hollow spheres of the invention.

FIG. 1 is a schematic diagram of illustrative apparatus 10 that may be used to form hollow spheres of the invention. This apparatus includes a hopper 11 into which parting agent particles are introduced and a hopper 12 into which solid granules of binder material containing a volatile void-forming agent are introduced. The parting agent particles and binder material granules are metered from the hoppers 11 and 12 into a trough 13 located beneath the hoppers. Alternatively the hopper 12 may be replaced with apparatus to meter liquid droplets onto a bed of parting agent particles in the trough 13. For best results a rather thin bed of parting agent particles is moved along the trough 13 to prevent deformation of the spheres that are to be ultimately formed. Depending on the density of the material being processed, the bed is usually between about 1 and 10 centimeters in depth, but it may vary outside this range under some circumstances.

From the trough 13 the parting agent particles and binder material granules travel in the illustrated apparatus to an inclined truncated-cone-shaped pan 14 which rotates about an axis 15 and which serves as a balling pan; then overflow into a trough 16; and then move into a cylindrical sphere-rolling or maintaining container 17 which rotates about its cylindrical axis 18 and in which the final hollow sphere-formation takes place. The balling pan 14 may be omitted if the material being fed will initiate sphere-formation in the cylindrical container 17. Also the parting agent particles and binder material granules may be added directly to the balling pan rather than being fed into a trough. Preferably, the inside surface of the cylinder 17 is roughened, as with a coating of particles. One or both of the balling pan 14 and cylindrical container 17 are generally heated, as by flame, by an electric furnace, or by the illustrated heating blankets 19 and 20, to melt solid binder material granules to a liquid globule form. Heat may also be used to maintain a desired viscosity; to evaporate solvent; to activate blowing agent within the binder material granules; and to ultimately advance reactive binder material globules to solidified form.

As the mixture of parting agent particles and binder material granules is tumbled inside balling pan 14 or the cylindrical container 17 and the granules melt, the void-forming agent vaporizes and causes a void to form in the liquid globules. Usually, but not necessarily, this void formation is accompanied by expansion in size of the globules. Further, the parting agent particles are wetted by liquid globules and become at least partially drawn into the globules. As the tumbling process continues, more and more parting agent particles may become absorbed into the globules.

At the same time, the liquid globules of binder material are hardening, as by a crosslinking reaction, by evaporation of solvent, or by cooling. The desired temperature within the sphere-forming cylinder 17 and length of travel through the cylinder is varied according to the materials used, depending on the melting point, melt viscosity, and reaction rate of the binder material; the ease of wetting of parting agent particles; the activity and amount of blowing agent; and the desired size of hollow spheres. Eventually a mixture of solidified hollow spheres and unabsorbed parting agent particles reaches the end of the cylinder 17 and drops onto a screen 21. The hollow spheres that have been prepared move along the screen 21 into a container 22, and excess parting agent particles drop through the screen into a second container 23 from where they may be reintroduced into the hopper 11. Depending on the nature of the hollow spheres, they may be subjected to further treatment, as by passing them through an oven 24 to postcure the binder material of the spheres.

Instead of apparatus as illustrated, which is adapted to a continuous process, the parting agent particles and either solid granules of liquifiable binder material or already liquid globules of binder material may be introduced directly into a single conical pan, where they are tumbled together to form hollow spheres of the invention. Generally a single batch is formed in such an apparatus; however continuous processing can also be performed, since the larger and lighter hollow spheres, when formed, tend to roll to the top and to the outer edge of the pan which is moving faster because of its greater circumference.

For smaller batches, a spherical flask having a tubular inlet can be used. The flask is filled with a mixture of parting agent particles and granules or globules of binder material, after which the flask is closed and attached to a shaft which rotates it about the axis of the tubular inlet. Such an apparatus has been found to allow an excellent control on temperature and rolling action.

Other apparatus besides rotating containers can also be used to accomplish tumbling and mixing of liquid globules of binder material and parting agent particles. Any means in which the liquid globules are agitated freely in a mixture of parting agent particles can be used. For example, a mixture of globules and parting agent particles can be vibrated in a flat bed. Such a means is particularly useful with smaller-sized globules.

A wide variety of binder materials may be used to form hollow spheres of the invention. More than one ingredient can be included in the binder material, although these ingredients will generally be dissolved or uniformly dispersed in one another. The result is that in a hollow sphere of the invention, as formed at the end of the sphere-forming operation and solidification of the binder material, the spherical wall of the sphere comprises only a single layer or thickness of the binder material, plus parting agent particles at least partially embedded in the layer or wall. There may be a gradation in the composition of the layer from one edge to the other edge; and there may be pigments, flow-control agents, fire-retarding agents, or other fillers (besides the parting agent particles) contained in the binder material as a discontinuous phase or dispersion. But the wall is a single-layer wall formed as a void develops in the liquid globule of binder material.

Illustrative organic ingredients of binder materials of the invention include epoxy resins; polycarbodiimides; formaldehyde resins such as phenol-formaldehydes, urea-formaldehydes, and melamine-formaldehydes; polyesters; polyisocyanurates; polyurethanes; natural rubber and synthetic elastomers, such as silicones, styrene-butadiene copolymers, chloroprenes, acrylonitrile-butadiene copolymers; acrylic resins; ethylene copolymers such as ethylene-vinyl acetate copolymers; propylene copolymers such as ethylene-propylene copolymers; and olefin-wax combinations. These materials may variously be formulated to solidify, as by polymerization, by crosslinking, by loss of volatiles, or by cooling.

Inorganic binder materials such as the low-melting glass described in U.S. Pat. No. 2,863,782 may also be used. Glass-forming binder material granules may be provided as spray-dried "slip" particles, prepared as in glaze or enamel preparation, which simplify incorporation of a volatile void-forming agent. In the case of inorganic ceramic or metal parting agents, the binder material may be a low-cost flux (such as sodium carbonate, sodium borate, or sodium silicate) and may be in the form of a water solution thickened to the proper viscosity with a material such as sodium alginate. This thickener acts as a temporary binder material prior to sintering the principal binder material.

During the sphere-forming operation the binder material should achieve a viscosity that is low enough for the parting agent particles to be wetted by the globules, and preferably low enough so that any cells forming inside an evacuated globule will tend to at least partially coalesce, whereby binder material will be concentrated at the exterior spherical wall or shell of the sphere. At the same time the viscosity of the binder material should be high enough so that the expanded globule will not deform excessively while sphere-formation is taking place. The useful range of viscosities for the binder material is broad, ranging from at least about 50 to 100,000 centipoises, but an especially preferred range is between about 100 and 10,000 centipoises. The globules of binder material in the tumbling, sphere-forming operation are termed liquid herein, since even when at high viscosity they are flowable. The range of useful viscosities will vary with particle size and the ease with which the parting agent particles can be wet. Surfactants can be used to advantage either as an ingredient in the binder material or as a treatment on the parting agent particle.

In general any solid discrete free-flowing particulate material, which is sufficiently inert (including sufficiently nonmelting) to retain its parting function throughout the sphere-forming operation, can be used as a parting agent particle. Examples of useful parting agent particles are hollow or solid glass microspheres; byproduct fines; ground scrap rubber particles such as vulcanized scrap rubber from tires; hard irregular abrasive particles (called "abrasive granules" herein) such as aluminum oxide granules used for abrasive products; magnetic iron oxide particles; perlite; clay; glass fibers or glass flakes; wood flour; flame-retardants such as aluminum trihydrate; organic polymeric particles; and metal particles. Mixtures of any of the above-mentioned particles may be used. For example, parting agent particles providing better flow properties may be mixed with irregular parting agent particles (high-flow silica particles are especially useful with irregular elastomeric particles, for example); or mixtures may be used to provide pigmentation, flame-retardancy, or variety in physical properties of the final sphere. Generally the parting agent particles will range from a few micrometers up to several hundred micrometers in size. They generally have a diameter no larger than the thickness of the wall of the final hollow sphere.

Hollow glass microspheres have the advantages of low-density, inertness, relatively low cost, impermeability, and perfect sphericity. Sphericity permits the parting agent to be packed very closely and thus minimizes the binder material needed in the spheres. Solid glass microspheres are another spherical parting agent particle, and fly-ash particles can be obtained in spherical form.

The void-forming agent used to form hollow spheres of the invention can be any substance which, while present in the binder material, evolves as a gas during the time and at the temperature of formation of the hollow spheres. It may be a separate ingredient added to the binder material; it may be a byproduct of reaction of the binder material; or it may be a solvent or carrier for the binder material. Often the void-forming agent is incorporated into the binder material while the latter is in liquid form prior to being solidified and formed into granules. In other cases it is mixed with milled solid binder material which is then spray-dried or compressed or otherwise prepared into granules.

Most often the void-forming agent causes an expansion in size of the liquid globules being formed into hollow spheres, since at least initially the outer wall of the globule tends to retain evolved gas. Sufficient void-forming agent is provided to form voids of the desired size. Examples of useful void-forming agents are: in the case of polycarbodiimide, a carbon dioxide reaction product of curing of the polycarbodiimide; in the case of some elastomers, a solvent for the elastomer precursor; and in the case of low-melting glass, water from hydrated borate or water contained in other "slip" particles.

The granules or globules of binder material introduced into the sphere-forming apparatus will vary in size depending upon the size of hollow sphere that is ultimately desired. Typically the granules are between about 100 micrometers (microns) and 1 centimeter in diameter, and most often are less than 5 millimeters in diameter.

Generally binder material granules in such a range of sizes produce hollow spheres about ½ millimeter to 2 centimeters in diameter. Spheres of the invention can be made with good uniformity of sizes by using binder material granules or globules of uniform size. Further, of course, hollow spheres may be screened after formation to provide desired ranges of sizes. The invention is generally used to produce macrospheres in any size in which the spheres are self-sustaining during the tumbling action. At the present time the most important uses for spheres of the invention occur when the spheres have an average diameter between about 1 millimeter and 2 centimeters, and most often less than 1 centimeter.

Figure 2:
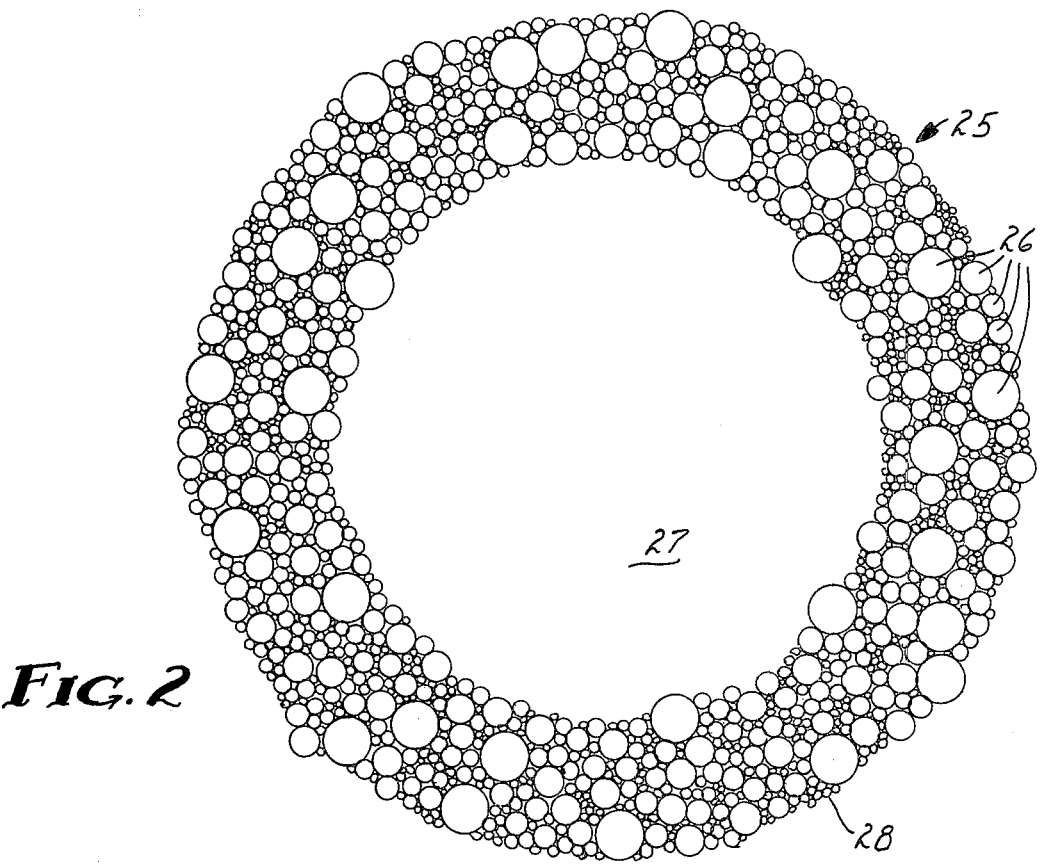
FIG. 2 is an enlarged cross-section through an illustrative hollow sphere of the invention.

FIG. 2 illustrates, in enlarged cross-section, a hollow sphere 25 of the invention in which the parting agent particles are hollow microspheres 26. In this sphere, the hollow microspheres have penetrated and filled the whole wall of the sphere, and the outer microspheres are only partially embedded in and partially protrude from the spheres. By capillary action, binder material may creep up the sides of exterior parting agent particles. Spheres of the invention are generally round but need not be perfectly spherical; they may be cratered or ellipsoidal, for example. Such irregular, though generally round or spherical, hollow products are regarded as "spheres" herein.

The hollow spheres formed by the invention preferably have a single hollow interior space, such as the space 27 of the sphere 25, enclosed by a single spherical wall or shell 28. In less preferred embodiments, the interior space in the sphere may be divided into a number of cells by interior walls having essentially the same composition as the exterior wall; but even such spheres have an outer wall, usually of rather constant thickness and of greater density, around the interior space. The outer wall is continuous and seamless (that is, without the junction lines resulting when two separately molded hemispheres are bonded together), though the wall may be permeable or porous. The thickness of the outer wall is generally less than about ½ the radius of the sphere and may be quite thin, as thin as 1/50 the radius, for example.

Most often the parting agent particles fill the entire thickness of a wall or shell of a hollow sphere of the invention. However if the cure rate or solidification rate of the spheres is quite rapid, or the viscosity of the binder material during the sphere-forming operation is quite high, or the parting agent particles have surface properties that make them difficult to wet, the parting agent particles may be absorbed only part way into the outer wall of the sphere. Even in such cases, the parting agent particles will usually fill at least a major portion (on the order of 50 percent or more) and preferably at least 75 percent of the thickness of the outer shell.

Figure 4:
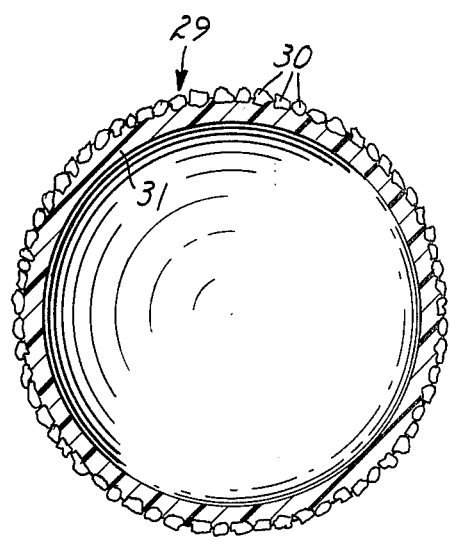
FIG. 4 is an enlarged cross-section through a different sphere of the invention.
Figure 3:
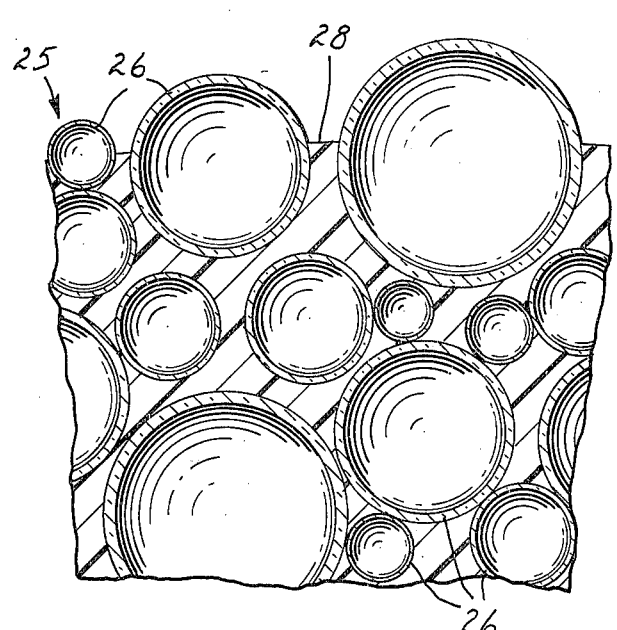
FIG. 3 is a fragmentary view of an edge-portion of the sphere shown in FIG. 2, greatly enlarged over the scale of FIG. 2.

The outer parting agent particles incorporated in the hollow sphere will be only partially embedded in and will partially protrude (usually at least 50 percent) from the exterior wall of the hollow sphere. In this way the outer parting agent particles form the exterior surface of the spheres that contacts other spheres in the formed mass of spheres. The spheres are thus, at least for the most part, kept separate from one another. In some cases, spheres of the invention have only an outer layer of parting agent particles partially embedded in, and partially protruding from, the exterior wall of the sphere. Such a sphere 29 is illustrated in FIG. 4 and includes irregular parting agent particles 30 partially embedded in the wall 31 and partially exposed.

Figure 5:
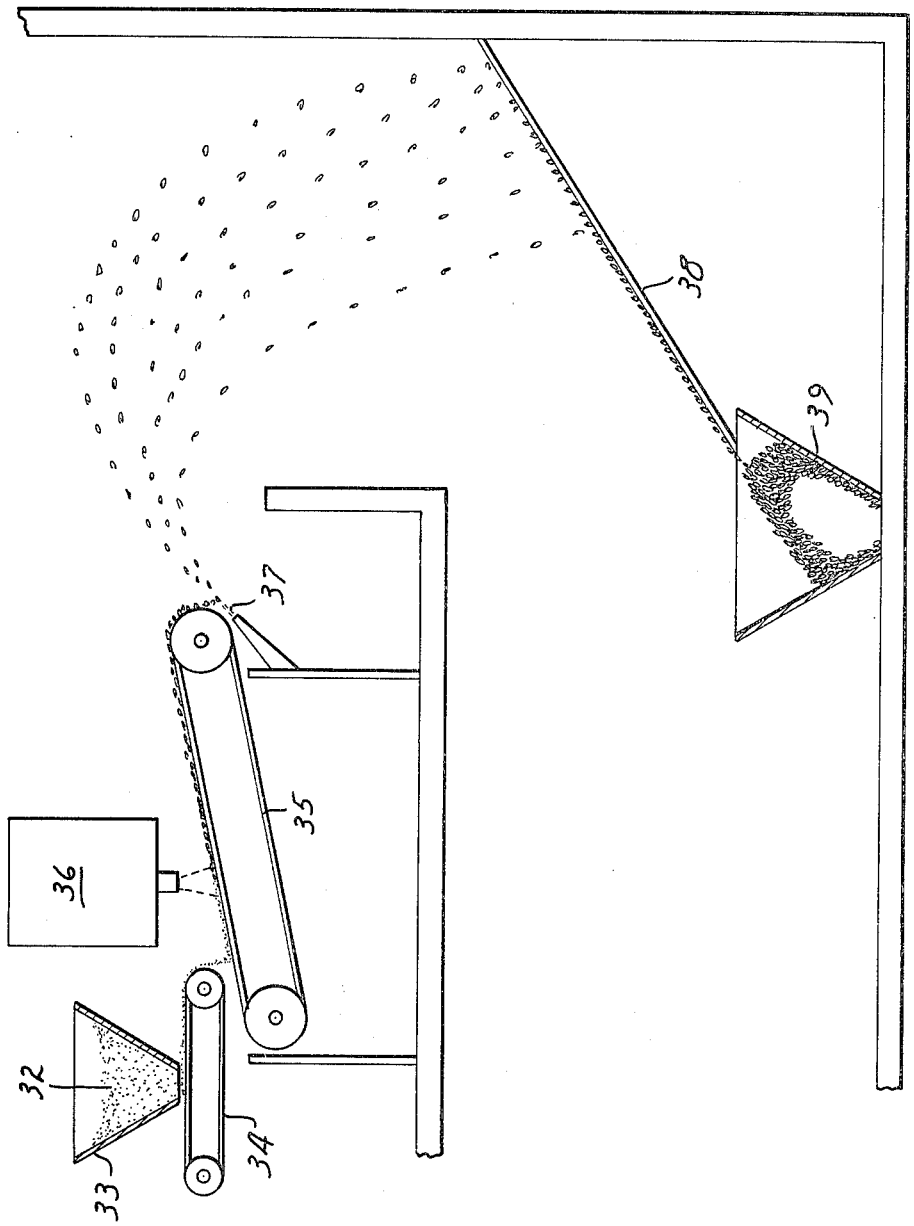
FIG. 5 is a schematic diagram of illustrative apparatus for sealing hollow spheres of the invention.

When the outer wall is porous (which may be achieved by using large parting agent particles or low-viscosity binder material), the spheres are often useful to absorb a liquid or gaseous fill, which may later solidify or crystallize within the sphere. Such a filling can be achieved by evacuating a mass of the hollow spheres and then immersing it in the filling fluid. Either after or without filling of the sphere, the outer wall may be sealed as by coating a liquid sealing resin onto the spheres. Such an operation is schematically illustrated in FIG. 5.

As shown there, permeable hollow spheres 32 contained in a hopper 33 are cascaded onto a conveyor belt 34 and travel to a second conveyor belt 35. While on the conveyor belt 35, a sealing material (such as a 15-weight-percent solution of catalyzed epoxy compound in methylene chloride) is sprayed onto the spheres from a tank 36. The sprayed spheres are carried to a jet of air 37 which blows them upwardly into a free-falling stream where the sealing material solidifies. The stream of sealed spheres is caught on inclined surface 38 and collected into a container 39.

Besides coatings applied to seal them, spheres of the invention may be provided with other exterior coatings. Examples of uses for such coatings are: to modify the overall properties of the spheres; to use the spheres as a support for some outer functional layer; and to adapt the spheres for inclusion in another structure.

Some of the uses for hollow spheres of the invention have been previously indicated. The unusually low densities of the spheres make them useful as fillers and extenders. Further, since the spheres provide relatively large volumes of prereacted material their use in large-volume systems reduces exotherm and thus, for example, minimizes heat-induced stress-cracking. These properties make them useful in molding furniture parts, bowling balls and the like, and in syntactic foams such as used for buoyancy in underwater vessels and offshore oil-drilling rigs. Good hydrostatic compressive strengths of syntactic foam prepared from hollow spheres of the invention — for example 5000 pounds per square inch (35 kilograms/square centimeter) at densities of 0.5 gram per cubic centimeter — add to the latter utility. Mixtures of the comparatively large hollow spheres of the invention with hollow microspheres in the manner described in Beck, U.S. Pat. No. 3,585,157, permits closer packing of fillers.

Hollow spheres of the invention may also be assembled into various constructions that are useful as an ultimate, intermediate, or component product. For example, a group of spheres may be bonded together into self-supporting blocks or composites. The spheres in the composites may be simply "tacked" together, as by use of a lightweight coating of bonding material on the exterior surface of the spheres or by a flowing together of binder material in adjacent spheres caused by heating or solvating the binder material. Composites of spheres have high void volumes and are useful as buoyancy products, for example, when enclosed within an enclosure or exterior film. Preformed blocks of spheres may also be formed in which the space between spheres is completely filled with a bonding material, which in itself may contain various fillers such as hollow microspheres. A mixture of different kinds of spheres may be used in such a composite to obtain a particular property.

In a different embodiment of the invention, hollow elastomeric spheres are adhered together, typically with an elastomeric bonding material, to form resiliently compressible structures. Such structures are useful, for example, as sponges or as resilient pads. Hollow elastomeric spheres of the invention may also be used individually, for example, as fillers for elastomeric materials.

Spheres of the invention may also be adhered to base substrates to provide useful products. In one construction a dense monolayer of uniformly sized hollow spheres of the invention is adhered to a porous carrier such as a scrim cloth to form a sheet material useful in reinforced synthetic polymeric products. Such a sheet material may be wound around a mandrel in one or more thicknesses, for example, and impregnated with resin to form pipe. Boat hulls, shower stalls, and furniture components may also be made using such a sheet material.

In a different construction, abrasive hollow spheres of the invention may be coated onto carrier sheets to form abrasive sheets capable of prolonged life and increased total cut. In addition, abrasive spheres of the invention may be incorporated into grinding blocks or wheels. Also abrasive hollow spheres of the invention, including those formed with an elastomeric binder material, may be used as a tumbling polishing medium.

Another use of hollow spheres of the invention is in building materials such as poured concrete or preformed concrete or slabs. The previously mentioned low cost of some hollow spheres of the invention, for example, those using industrial or mineral waste fines, especially adapts those spheres to use in building materials. The utility of hollow spherical fillers in concrete was recognized in U.S. Pat. No. 868,762, issuing in 1907, but insofar as known a low-cost large-diameter filler for that purpose has never been available until the present invention.

In a different kind of use, the spheres of the invention provide useful storage systems. Liquid fills, as two reactive ingredients each in different macrospheres, may be stored in spheres of the invention which are ruptured at the time it is desired to initiate reaction of the ingredients.

The invention will be further illustrated by the following examples.

EXAMPLE 1

Hollow glass microspheres ranging from 10 to 120 micrometers in diameter were mixed in an amount of 5.2 grams with 5.2 grams of a particulate composition consisting of 100 parts of a diglycidyl ether of bisphenol A having an epoxide equivalent weight of 550–700 (Epon 1002), 0.26 part of 2,4,6(dimethyl-aminomethyl) phenol (DMP-30) and 5 parts of cyanoguanidine (dicyaniamide). The particulate composition had been crushed and screened to a 5-to-8 mesh (U.S. Standard Screen) size (2380 to 4000 micrometers). Upon reaction, the epoxy-based composition releases water to provide a blowing action.

The mixture was put into a round-bottom 500-cubic-centimeter flask the interior surface of which was roughened with a sparse layer of 20-mesh to 50-mesh (300 to 840 micrometer silica granules adhered on its inside surface by the described epoxy-based composition. With the flask inclined from horizontal and rotated with sufficient speed to give a good rolling action to the contents, the bottom of the flask was heated by a Meeker burner to provide a batch temperature of 300° F. (150° C.). Reaction was carried on for two minutes, after which heat was removed and the contents cooled to room temperature while rotation continued.

The product consisted of 65 bulk cubic centimeters of hollow macrospheres; brown in color; having walls filled with microspheres and covered on their exterior with partially embedded, partially protruding microspheres; and being permeable to a dye solution. The calculated apparent true density of the spheres was 0.20 gram per cubic centimeter, and they were distributed in sizes as follows: 4 grams, 3 to 6-½ mesh (670 to 3100 micrometers); 3.5 grams, 6-½ to 8 mesh (3100 to 2380 micrometers); 1 gram, 8 to 14 mesh (2380 to 1190 micrometers) and 0.8 gram excess bubbles.

EXAMPLE 2

Example 1 was repeated except that the batch temperature was lower, 255° F. (126° C.), and the reaction was carried out for 20 minutes. The product consisted of 37 bulk cubic centimeters of beige-colored, dye-impermeable, hollow macrospheres having walls filled with microspheres and covered on their outer surface with partially embedded, partially protruding microspheres. The calculated apparent true density was 0.35 gram per cubic centimeter and the size distribution was 1 gram, 3 to 6-½ mesh (6750 to 3100 micrometers); 4.7 grams, 8 to 14 mesh (2380 to 1190 micrometers) and 0.4 gram excess bubbles.

EXAMPLE 3

A batch as described in Example 1 but weighing ten times as much was reacted in a conical reactor that had a height of 1 foot (30 centimeters), a bottom diameter of 1 foot (30 centimeters), and a top diameter of two feet (60 centimeters). The shaft of the reactor was inclined at an angle just high enough to prevent the batch from rolling out (about 40° to horizontal). The interior was roughened with a sparse layer of 20-to-50 mesh (300 to 840 micrometer) silica granules. Two Meeker burners were used for heating externally. Since some microspheres were lost out of the open reactor due to air currents, it was necessary to add more microspheres to replenish this supply. The batch was reacted at 300° F. (150° C.) for two minutes. The product was very similar to that of Example 1 in character and was 590 bulk cubic centimeters in volume.

EXAMPLE 4

Example 1 was repeated, except that a rotary cylindrical kiln, having a length of 61 centimeters, a diameter of 10 centimeters, an inclination of 5°, and an inside surface roughened with 20-mesh to 50-mesh silica granules, was used. Results were very similar to those of Example 1, but sphericity of the macrospheres was poorer, and there was a few percent of flattened spheres.

EXAMPLE 5

Ten grams of 4-to-5-mesh (4760 to 400 micrometer) pellets of an aromatic polycarbodiimide prepolymer containing a phospholine oxide catalyst (as described in Reich, U.S. Pat. No. 3,775,242, Example No. 3) and 100 bulk cubic centimeters (20 grams) of 10-to-120-micrometer-diameter hollow glass microspheres were mixed in a one-liter spherical glass flask (as in Example 1) which was rotated at 65 rpm for 10 minutes at 300° F. (150° C.). The polycarbodiimide prepolymer pellets first liquified and then reacted, liberating carbon dioxide, to produce hollow solid macrospheres. The macrospheres were beige in color, had walls filled and covered on their outer surface with microspheres, and averaged about 1 centimeter in diameter. Bulk density was 0.961 gram per cubic centimeter. The product was permeable to air but not to water under a vacuum of about 12 millimeters mercury.

EXAMPLE 6

In a conical reactor having an upper diameter of 20 centimeters and a lower diameter of 15 centimeters was placed a mixture containing 2 grams of 14-to-20-mesh (1190 to 840 micrometer) pellets of the polycarbodiimide-based composition described in Example 5 and 20 grams of minus-100 mesh (less than 150 micrometers) black rubber particles ground under cryogenic conditions. Reaction was carried out as described in Example 5 to form hollow rigid macrospheres having a diameter of about 1/16 inch (1.5 millimeter) and having walls filled and covered on their outer surface with the rubber particles.

EXAMPLE 7

Twenty grams of minus-70 mesh, black, cryogenically ground rubber particles (less than about 200 micrometers in diameter) was introduced into a conical reactor as described in Example 6. While the reactor was rotated and heated, droplets of a mixture of diisocyanate-terminated tetramethylene oxide polyether (Adiprene L-100) and 3-methyl-1-phenyl-2-phospholene-1-oxide catalyst were added one at a time. Good hollow elastomeric spheres were formed. The walls of the spheres constituted about 25 percent of the radius, and were filled and covered on their outer surface with the rubber particles. The blowing agent in this example was carbon dioxide which is a product of reaction of the binder material.

EXAMPLE 8

Twenty grams of 20-to-40 mesh (840 to 420 micrometer) pellets of the polycarbodiimide-based composition described in Example 5 and 100 cubic centimeters bulk volume of 280-mesh (50 micrometer) aluminum oxide abrasive granules were reacted six minutes in the manner described in Example 5. The product consisted of hollow abrasive spheres about 1 millimeter in average diameter. The walls had a thickness equal to about 50 percent of the radius, and they were filled and covered on their outer surface with the abrasive granules.

EXAMPLES 9-21

Example 8 was repeated using a variety of sizes of the polycarbodiimide prepolymer binder material granules and a variety of different parting agent particles. The conditions are described in Table I and the products prepared are described in Table II (permeability is measured as the percent number of spheres that become filled enough to sink when floated on a concentrated solution of zinc chloride in water having a density of about 1.8).

TABLE I

| Ex. No. | Binder Material Amount (grams) | Binder Material Size (micrometers) | Parting Agent Particles Kind | Parting Agent Particles Bulk Volume (cubic centimeters) | Parting Agent Particles Size (micrometer) | Reaction Conditions Temperature (° C) | Reaction Conditions Time (minutes) |
|---|---|---|---|---|---|---|---|
| 9  | 5  | 1190–2380 | Glass microspheres | 50  | 20–120 | 175 | 5  |
| 10 | 5  | 1190–2380 | Glass microspheres | 100 | 20–120 | 200 | 10 |
| 11 | 5  | 1190–2380 | Glass microspheres | 100 | 10–80  | 175 | 5  |
| 12 | 5  | 2380–4000 | Glass microspheres | 10  | 10–80  | 285 | 10 |
| 13 | 5  | 1190–2380 | Kaolin | 100 | <50 | 200 | 10 |
| 14 | 5  | 1190–2380 | Pecan shell flour | 100 | <150 | 200 | 10 |
| 15 | 5  | 1190–2380 | Fine silica (Cab-O-Sil) | 50 | <50 | 200 | 10 |
| 16 | 5  | 1190–2380 | Perlite (supplied by Buffalo Perlite Co.) | 100 | 20–125 | 200 | 10 |
| 17 | 5  | 1190–2380 | Silica (G-100 Silcron, supplied by Glidden) | 100 | <10 | 200 | 10 |
| 18 | 5  | 1190–2380 | Poatassium titanate (Fybex supplied by duPont) | 100 | <10 | 200 | 10 |
| 19 | 10 | 4000–4760 | Glass microspheres | 100 | 10–80 | 150 | 10 |
| 20 | 5  | 250       | Glass microspheres | 50  | 10–80 | 175 | 6  |
| 21 | 20 | 420–840   | #280 aluminum oxide abrasive granules | 100 | <80 | 175 | 6 |

TABLE II

| Example No. | Amount (grams) | Bulk Density (gram/cubic centimeter) | Calculated True Density (gram/cubic centimeter) | Permeability (percent) |
|---|---|---|---|---|
| 9  | 8.33  | .135 | 0.21 | 74 |
| 10 | 9.54  | .134 | 0.21 | 54 |
| 11 | 8.15  | .118 | 0.19 | 14 |
| 12 | 8.0   | .080 | 0.12 | 4  |
| 13 | 8.86  | .232 | 0.35 | 43 |
| 14 | 13.6  | .240 | 0.35 | 100 |
| 15 | 7.0   | .113 | 0.17 | 79 |
| 16 | 9.4   | .096 | 0.15 | 41 |
| 17 | 6.80  | .137 | 0.22 | 42 |
| 18 | 5.60  | .230 | 0.36 | 92 |
| 19 |       | .061 | 0.09 | 0  |
| 20 | 6.0   | .286 | 0.39 |    |

EXAMPLE 22

Phenolic resin particles (ammonia-catalyzed condensation product of phenol, o-cresol, and formaldehyde having a mole ratio of 1 to 1.5 moles of formaldehyde to 1 mole of phenol; the product is a heat-reactive, thermosetting, single-stage phenolic resin) screened by 14-mesh and 20-mesh screens (840 to 1190 micrometers) were dropped into a 9-inch-diameter (23-centimeter) pan which contained a bed of 10- to 100-micrometer-diameter hollow glass microspheres, was inclined at an angle of 35°, and was rotating about two revolutions per second. The pan was heated from below with a Bunsen burner to a temperature of 250° F. (120° C.). Solid hollow macrospheres formed in about two minutes, with water serving as a blowing agent. The macrospheres were approximately 3 millimeters in diameter with thin, very strong walls (about 20 percent of the radius) filled and covered on their outer surface with the microspheres. The interior of the spheres was glossy indicating a high degree of impermeability. The bulk density was 0.15 gram per cubic centimeter.

EXAMPLE 23

A mixture comprising three parts of an approximately 5-weight-percent solution of methyl cellulose in water (Methocel HG 100; having an estimated viscosity of about 5000 centipoises) and one part of air-floated plate glass fines was dropped slowly from a needle-less hypodermic syringe into a 9-inch-diameter (23-centimeter) balling pan. The pan was inclined at an angle of 35°, was rotating at a rate of about 2 revolutions per second, and contained 50-to-200-mesh (74 to 300 micrometer) waste greystone fines from a roofing granule operation. Heat was applied with a Bunsen burner. The droplets foamed as they were rolled in the greystone fines and formed thin-walled self-supporting noncoalescing hollow spheres about 4–5 millimeters in diameter. The outer walls of the spheres comprised the glass-particle-impregnated methyl cellulose as binder material and were filled and covered on their outer surface with the greystone fines. These hollow spheres were then fired at 1000° C for 10 minutes in a procelain crucible in a muffle furnace to burn off the remaining methyl cellulose and to vitrify the sphere into a ceramic product. The parting agent particles continued to partially protrude after the sintering operation.

EXAMPLE 24

A low-melting glass as described in U.S. Pat. No. 2,863,782 was milled in an amount of 10.5 grams with 0.3 gram of sodium borate in a water slurry. The milled "slip" was dried, crushed, and screened (to 14-to-30-mesh size; 590 to 1190 micrometers) to be used as a binder material. These particles were mixed with 60-to-270-mesh (53 to 250 micrometer) waste taconite fines and the mixture was rotated in a small nickel balling pan inside a gas-fired furnace at 960° C. Hollow, all-ceramic, glass-bonded taconite spheres ranging from about 2 to 4 millimeters in diameter resulted.

EXAMPLE 25

Macrospheres having an average diameter of about 450 to 600 micrometers were prepared by the procedure described in Example 22 (except that the pan was heated to about 180° C) using polycarbodiimide pellets as described in Example 5 and a parting agent mixture including grade-240 aluminum oxide granules and 1-to-300-micrometer-diameter hollow glass microspheres in a 3-to-1 ratio by volume.

A standard 61-inch-wide (150-centimeter) backing for coated abrasives consisting of 1.35 yard-per-pound drills cloth, presaturated in order to maintain flexibility was uniformly coated with 29 grains per 4-by-6-inch area of an 84% solids adhesive mixture containing 30 weight-percent calcium carbonate and 70 weight-percent of a phenol-formaldehyde resin commonly known in the art as a resole resin. Shortly after applying this adhesive mixture, 62 grains per 4-by-6-inch area of the described macrospheres were uniformly drop-coated on the wet backing, and the coated backing then precured for 2 hours at 225° F. (105° C.). The web was then uniformly coated (or sized) with 64 grains per 4-by-6-inch area of an 82% solids mixture consisting of 68 weight-percent calcium carbonate and 32 weight-percent of the same phenol-formaldehyde resin. The sized web was given a final cure of 10 hours at 190° F. (90° C.) and flexed by drawing the web over a 2-inch-diameter (5-centimeter) roll. Coated abrasive belts were fabricated from this material using standard techniques.

A one-inch-square workpiece of 1018 stress-relieved mild steel was ground at 5 pounds/inch (0.9 kilogram/centimeter) load with a 132-inch-long (3.3 meters) belt traveling at 5500 surface feet (1650 meters) per minute over a 14-inch-diameter (35-centimeter) solid rubber Shore-A-durometer-contact wheel. Under these conditions a standard coated abrasive construction cuts 130 grams of metal before dulling in 24 minutes. Under the same conditions, the abrasive belt of this example cuts 501 grams of metal before dulling in 144 minutes.

What is claimed is:

1. A free-flowing mass of hollow spheres where individually are about 2 centimeters or less in diameter and comprise a solidified seamless spherical exterior wall that defines and encloses a central interior space, the exterior wall of the individual spheres being a composite structure that comprises a single thickness of binder material and a plurality of solid particles held by the binder material; at least a major portion of said thickness of binder material being filled by the particles, with a portion of the particles being totally embedded in the binder material, and with the outermost particles being only partially embedded in the binder material and partially exposed whereby they form the exterior surface of the sphere that contacts adjacent spheres in the mass.

2. Spheres of claim 1 in which the particles comprise hollow microspheres.

3. Spheres of claim 1 in which the particles comprise hard irregular abrasive granules.

4. Spheres of claim 1 in which the particles comprise elastomeric particles.

5. Spheres of claim 1 in which the particles comprise ground scrap rubber.

6. Spheres of claim 1 in which the particles comprise byproduct fines.

7. Spheres of claim 1 in which said particles include a mixture of different kinds of particles.

8. Spheres of claim 1 in which said binder material is elastomeric.

9. Spheres of claim 1 in which said binder material includes a particulate filler material in addition to the particles.

10. Spheres of claim 1 in which said binder material comprises glass-forming particles and an ingredient that is removable upon subsequent heating of the spheres, whereupon the glass-forming particles fuse.

11. Spheres of claim 1 in which said exterior wall is permeable to a liquid under pressure.

12. Spheres of claim 1 that have been covered on their exterior surface with a coating of resin.

13. Spheres of claim 1 that contain a liquid fill enclosed by the exterior wall of the spheres.

14. Spheres of claim 1 averaging between about 1 millimeter and 1 centimeter in diameter.

15. Spheres of claim 1 in which the exterior wall has a thickness equal to between about 1/100 and ½ the radius of the spheres.

16. A free-flowing mass of hollow spheres which individually are about 2 centimeters or less in diameter and comprise a solidified seamless spherical exterior wall that defines and encloses a central interior space; the exterior wall of the individual spheres comprising a layer of binder material and a plurality of hard irregular abrasive granules, at least some of which are partially embedded in the binder material and partially exposed whereby they form the exterior surface of the sphere that contacts adjacent spheres in the mass.

17. A free-flowing mass of hollow spheres which individually are about 2 centimeters or less in diameter and comprise a solidified seamless spherical exterior wall that defines and encloses a central interior space, the exterior wall of the spheres being a composite structure that comprises a single thickness of inorganic binder material and a plurality of byproduct-fine particles held by the binder material; at least a major portion of said thickness of binder material being filled by the particles, with a portion of the particles being totally embedded in the binder material, and with the outermost particles being only partially embedded in the wall and partially exposed whereby they form the exterior surface of the sphere that contacts adjacent spheres in the mass.

18. A free-flowing mass of resiliently compressible hollow spheres which individually are about 2 centimeters or less in diameter and comprise a solidified seamless spherical exterior wall that defines and encloses a central interior space, the exterior wall of the individual spheres comprising a layer of elastomeric binder material and elastomeric particles, at least some of which are partially embedded in the binder material and partially exposed whereby they form the exterior surface of the sphere that contacts adjacent spheres in the mass.

19. A free-flowing mass of hollow spheres averaging between about 0.05 and 2 centimeters in diameter prepared by (A) tumbling together and thoroughly mixing (1) solidifiable liquid globules of binder material that contain a source of void-forming agent adapted to evolve as a gas and convert the liquid globules to a hollow condition and (2) a mass of minute discrete free-flowing parting agent particles that are wetted by, and at least partially absorbed into, the liquid globules during the tumbling action; sufficient parting agent particles being present so that any portion of liquid globules uncovered by parting agent particles tumble against discrete unabsorbed parting agent particles;

(B) providing conditions during the tumbling action, and tumbling for a sufficient time, for the void-forming agent to evolve as a gas and form a central interior space within the liquid globules and for the thus-hollowed liquid globules to solidify; and (C) collecting the converted globules after they have solidified to a shape-retaining condition; said spheres having a solidified seamless spherical exterior wall that defines and encloses a central interior space and that comprises a single thickness of binder material and a plurality of parting agent particles, at least a major portion of said thickness being filled by the particles, with the outermost particles being only partially embedded in the wall and partially exposed whereby they form the exterior surface of the sphere that contacts adjacent spheres in the mass.

20. Spheres of claim 18 in which said elastomeric particles also fill at least a major portion of the exterior wall of the spheres.

21. A method for preparing a mass of hollow spheres comprising:
(A) tumbling together and thoroughly mixing (1) solidifiable liquid globules of binder material that contain a source of void-forming agent adapted to evolve as a gas and convert the liquid globules to a hollow condition and (2) a mass of minute discrete free-flowing parting agent particles that are wetted by, and at least partially absorbed into, the liquid globules during the tumbling action; sufficient parting agent particles being present so that any globules uncovered by parting agent particles tumble against discrete unabsorbed parting agent particles;
(B) providing conditions during the tumbling action, and tumbling for a sufficient time, for the void-forming agent to evolve as a gas form a central interior space within the liquid globules and for the thus-hollowed liquid globules to solidify; and
(C) collecting the converted globules after they have solidified to a shape-retaining condition.

22. A method of claim 21 in which the solidifiable liquid globules are formed coincidentally with the tumbling action by heating originally solid granules of binder material to a temperature at which the granules become molten.

23. A method of claim 21 in which the solidifiable liquid globules solidify during the tumbling action as a result of crosslinking of the binder material of the globules.

24. A method of claim 21 in which said conditions of step (B) comprise heating the tumbling mixture of liquid globules and parting agent particles.

25. A method of claim 21 in which the liquid globules and parting agent particles are tumbled together in an inclined rotating container.

26. A method of claim 21 in which the parting agent particles are hollow microspheres.

27. A method of claim 21 in which the globules of binder material comprise a water-based dispersion of fusible inorganic particles and said conditions comprise heating to dry the dispersion to a self-supporting form.

28. A method of claim 21 in which the parting agent particles comprise byproduct fines.

29. A method of claim 21 in which the parting agent particles comprise hard irregular abrasive granules.

30. A method of claim 21 in which the parting agent particles comprise elastomeric particles.

31. A method of claim 30 in which the binder material also comprises elastomeric material.

32. A free-flowing mass of hollow spheres prepared by the method of claim 21.

* * * * *